(12) United States Patent
Kruglick (10) Patent No.: US 8,818,711 B2
(45) Date of Patent: Aug. 26, 2014

(54) 3D PATH ANALYSIS FOR ENVIRONMENTAL MODELING

(75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 409 days.

(21) Appl. No.: 12/642,355

(22) Filed: Dec. 18, 2009

(65) Prior Publication Data

US 2011/0153208 A1  Jun. 23, 2011

(51) Int. Cl.
  *G08G 1/09* (2006.01)
  *G01C 21/34* (2006.01)
  *G01C 21/30* (2006.01)

(52) U.S. Cl.
  USPC ............... 701/411; 701/410; 701/433

(58) Field of Classification Search
  USPC ............ 340/995.1, 988, 435, 539.13, 539.22;
    701/533, 532, 469, 410, 426, 428, 1, 3,
    701/23, 24, 26, 209, 301, 408, 411, 414,
    701/420, 431, 433, 439, 488, 517, 521, 25,
    701/409, 434, 117, 202; 342/357.55, 357.4,
    342/450; 715/205, 230, 848; 705/1.1, 6,
    705/7.11, 14.1, 51; 382/103, 113; 345/589,
    345/629; 348/46, 51, 55
  See application file for complete search history.

(56) References Cited

U.S. PATENT DOCUMENTS 7,356,405 B1 * 4/2008 Nesbit ........................ 701/533
7,487,041 B2 * 2/2009 Devries et al. ............... 701/433
2006/0206258 A1 * 9/2006 Brooks ....................... 701/202
2007/0005231 A1 * 1/2007 Seguchi ...................... 701/117
2007/0061075 A1   3/2007 Kim
2007/0210937 A1 * 9/2007 Smith et al. ............... 340/995.1
2007/0213092 A1   9/2007 Geelen
2008/0046173 A1 * 2/2008 Lappe et al. ................ 701/209
2008/0054072 A1 * 3/2008 Katragadda et al. ........ 235/384
2008/0059015 A1   3/2008 Whittaker et al.
2008/0170118 A1 * 7/2008 Albertson et al. .............. 348/46
2008/0201074 A1 * 8/2008 Bleckman et al. ........... 701/211
2008/0252527 A1 * 10/2008 Garcia ........................ 342/450
2008/0262721 A1   10/2008 Guo et al.
2009/0291418 A1   11/2009 Srivastav et al.
2010/0145608 A1 * 6/2010 Kurtti et al. ................. 701/202

FOREIGN PATENT DOCUMENTS

CN   101290725 A   10/2008

(Continued)

OTHER PUBLICATIONS

International Search Report and Written Opinion, mailed Sep. 15, 2010, as issued in connection with Patent Application No. PCT/US2010/036611, filed on May 28, 2010.

(Continued)

*Primary Examiner* — Tuan C. To
*Assistant Examiner* — Isaac Smith
(74) *Attorney, Agent, or Firm* — Maschoff Brennan (57) ABSTRACT

Techniques for constructing a path analysis in an area are provided. Data are received from a mobile device in an area. The data is based on a path that is traversed by the mobile device. A traversable path is then determined from the data received from the mobile device. The traversable path is superimposed on a map and the map, including the traversable path, is packaged for delivery or display to requesting devices.

25 Claims, 7 Drawing Sheets

(56) References Cited

FOREIGN PATENT DOCUMENTS

| | | |
|---|---|---|
| JP | 2002-297611 A | 10/2002 |
| JP | 2003-240592 A | 8/2003 |
| JP | 2007-333998 A | 12/2007 |
| KR | 2008-0007437 A2 | 1/2008 |
| WO | 2006/116240 A2 | 11/2006 |

OTHER PUBLICATIONS

Dash.net "Auto GPSes to determine speed and blocked routes" [online: http://www.dash.net/product/traffic-ddn.php].

"Walking Directions in Google Maps," accessed at http://www.darrenbarefoot.com/archives/2008/07/walking-directions-in-google-maps.html, Jul. 22, 2008, pp. 4.

* cited by examiner

3D PATH ANALYSIS FOR ENVIRONMENTAL MODELING

BACKGROUND

Electronic devices such as computers and mobile devices are becoming increasingly integrated into everyday life. Mobile devices are often provisioned with applications, such as email, that are becoming increasingly useful. Many people use their mobile devices as one of their primary means of communication.

The capabilities of mobile devices are not limited to applications such as email. Other applications are becoming more common. Some mobile devices, for example, have mapping applications. With advances in GPS technologies, travel can made easier through the use of digital maps that are presented by the mapping applications. However, the digital maps are often limited to existing roadways and are often unable to dynamically adapt to changing roadway conditions. More specifically, the ability of conventional mapping applications to provide directions or identify traversable paths is tied to existing roadways. Although mapping applications may be able to identify the location of a user using GPS technologies, they are unable to provide mapping capabilities that do not follow existing roads.

For example, consider a situation where a person is walking in a park. When asked for directions to the other side of the park, conventional mapping technologies are likely to provide directions that follow the roads. In other words, these mapping technologies provide directions that are based on existing roadways. Following directions based on existing roadways would likely lead the person around the outskirts of the park along the roads rather than identify a traversable path through the park.

While some mapping applications may augment their information with satellite imagery, satellite imagery does not identify traversable paths and directions are still based on existing roadways. In addition, it is often difficult for a user to distinguish a traversable path in satellite imagery because satellite imagery is often out of date and at insufficient resolutions. Also, it is difficult for a user to distinguish between shadows, impassable water features, elevation changes, and the like in satellite imagery. In effect, there are many areas, such as parks and public walkways that are poorly mapped. Trying to traverse these areas using conventional mapping applications is often unreliable and frustrating.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Embodiments disclosed herein relate to environmental modeling including, but not limited to, mapping. Location data is collected from location-enabled devices operating in an area. The location data is then analyzed to determine or identify paths that the devices traversed. The location data can be processed to determine traversable paths that can be provided to other devices, for example as maps or superimposed on existing maps.

Over time, location data can be collected from many different devices and the location data that these devices provide can be analyzed and used as mapping data. Specifically, traversable paths can be determined from the collected location data. The traversable paths can then be overlaid onto existing maps of parks (or other areas) to identify traversable paths (e.g., for runners, walkers, bike riders, vehicles, etc.) through the park or other areas.

The analysis of the location data can be used to identify areas that should be avoided, such as brushes or other natural growth or impediment, walls, construction zones or areas, elevation changes, or the like, when generating traversable paths. In addition, the traversable paths that are determined from the collected data can be updated dynamically as the environment changes and new location data is collected. For instance, location data collected after the completion of a construction project may result in a new traversable path that was not previously present or that was not evident from existing location data.

The location data collected from location-enabled devices provides a crowd-sourced multi-dimensional map of traversable space. The map of the traversable space can be updated over time as additional location data is collected for the traversable space.

In addition, the analysis of the location data can distinguish between location data that is collected, from example, from a device in an automobile versus a device carried by a user that is walking. Some embodiments described herein provide an automated solution for modeling areas that have complicated features and shapes. The traversable paths generated from the location data can account for the features and shape of an area, even when information about the features and shapes may not be known. Embodiments disclosed herein can identify traversable paths for indoor areas (including specific paths for different elevations), outdoor areas, and the like or any combination thereof.

Figure 1:
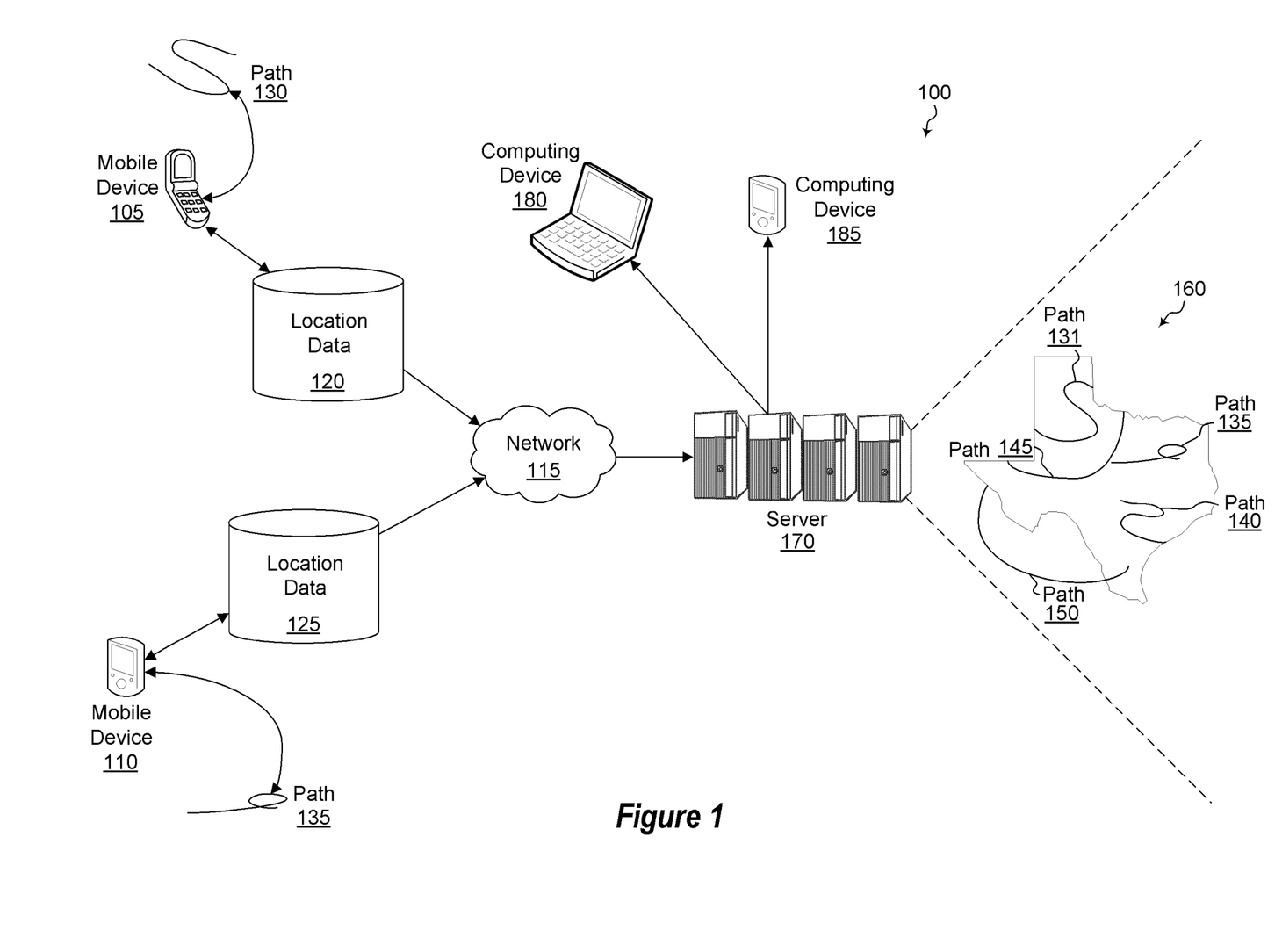
FIG. 1 shows an illustrative embodiment of a map modeling system.

FIG. 1 shows an illustrative embodiment of a map modeling system 100. The system 100 may include a server 170 that can be configured to either receive data from or poll data from devices including mobile devices, for example, a mobile device 105 and a mobile device 110. The data received or collected from the mobile devices 105 and 110 may include, respectively, location data 120 and location data 125. Depending on whether the system 100 is a push or a pull system (or some hybrid thereof), the server 170 can standby and passively receive the location data 120 and 125 from the mobile devices 105 and 110 and/or the server 170 can actively poll the mobile devices 105 and 110 for the location data 120 and 125.

The location data 120 and 125 that is received or collected from the mobile devices 105 and 110 generally includes the specific locations of the mobile devices 105 and 110. For instance, the locations of the mobile devices 105 and 110 may be expressed in terms of latitude, longitude and/or elevation.

The location data 120 and 125 may also include data from other applications and/or sensors, such as accelerometer data, altimeter data, direction data, or the like or any combination thereof. In addition, the location data 120 and 125 may also include identifiers such that the location data 120 and 125 can be analyzed to identify the paths followed by the mobile devices 105 and 110. In one example, the identifiers enable the server 170 to identify the specific paths followed by the mobile devices 105 and 110.

Because the paths of the mobile devices 105 and 110 are not generally known or predetermined, the location data 120 and 125 in this context can be referred to as non-predetermined path data. In contrast to predetermined path data (e.g., data about the location of highways, roads, sidewalks, and so on), non-predetermined path data can include data about paths (e.g., through parks, construction areas, etc.), frequently used but not mapped paths (e.g. in enclosed structures, such as buildings), and any paths used by foot, bike, or even car that are not shown in traditional maps.

The location data 120 and 125 collected from the mobile devices 105 and 110 may include non-predetermined path data. In some instances, some of the location data 120 and 125 may correspond to both non-predetermined path data and to predetermined path data (such as when a user is crossing a road). This determination can be made by the mobile devices 105 and 110 themselves or by the server 170. However, the presence of location data that corresponds to predetermined path data (such as a road) in the location data 120 and 125 collected from the mobile devices 105 and 110 can be incorporated into the environmental modeling or mapping data that is generated from the location data 120 and 125, including the non-predetermined path data. For example, the predetermined path data may be combined with the non-predetermined path data to identify crosswalks (or other areas that may identify the intersection of predetermined path data with non-predetermined path data) that occur in the traversable paths generated from the location data 120 and 125.

Paths that are generated from non-determined path data may be dynamic and thus may change over a period of time (unlike a highway). These paths are not necessarily pre-determined and can be determined by analyzing the location data 120 and 125 collected from the mobile devices 105 and 110.

For instance, the location of the mobile device 105 can be determined by collecting or receiving the location data 120. The location data 120 may include, by way of example only, GPS data and an identifier. The movement of the mobile device 105 can then be determined analyzing the location data 120.

More specifically, the mobile device 105 may have an embedded GPS device that can log the location of the mobile device 105 at various intervals, which may be pre-determined. Over time, the mobile device 105 logs multiple locations that can be stored in memory of the mobile device 105 (although the mobile device 105 can transit each location as it is measured rather than logging the location at the device itself). The rate at which the location data 120 is logged can vary. For example, the mobile device 105 may log the location data 120 at intervals, which can be set or determined in terms of distance, time, device measurements, or the like or any combination thereof. For example, the interval can be a foot or a meter, if the user is walking, or a few hundred feet or meters if the user is driving a car. Alternatively, the interval can be measured in time. The interval can be a few seconds, if the user is driving a car, or several or more seconds, if the user is walking. Thus, logging the location data 120 can be context dependent.

In yet another example, the interval can be fixed (every 1 second; or every 5 seconds; or every 10 seconds). The amount of logging can be inversely proportional to battery life. Thus, in one example, users can set the specifications regarding how much logging will be performed (and thus how much battery usage will be expanded). In still another example, the mobile device carrier can set a standard logging interval (e.g., every 5 seconds). Alternatively, changes in acceleration and/or direction of the mobile device 105 can be used to trigger the logging of the location data 120.

The particular context (e.g., walking, driving, bike riding, etc.) of mobile devices can be determined from accelerometer data (alone and/or in combination with the GPS data). The mobile devices of users that walk have (relatively) small acceleration data; the mobile devices of users that drive have (relatively) large acceleration data; the mobile devices of users that are cycling have a comparably different acceleration data. Such mobile device location data is rich enough for three dimensional mapping (3D), since the data is derived from GPS, accelerometer, altimeter, and/or other devices or sensors on the mobile device. For example, a GPS device can provide the X and Y dimensions (left, right, up and down), and the accelerometer and/or altimeter device can help determine the Z (height) dimension and/or direction.

The location data 120 can then be collected by the server 170 and evaluated to identify a path 130 traversed by the mobile device 105. Similarly, the location data 125 can be evaluated to determine a path 135 of the mobile device 110. Each instance of the location data 120, for example, may form a point of the path 130. The points can be connected, for example by interpolation, by the server 170 (or by the device itself) to determine the path 130.

Thus, the paths 130 and 135 can be tracked using GPS technology when users have an application for path tracking turned on. As mentioned above, in order to obtain data about the vertical movement of mobile users (thus enhancing tracking to three dimensions, instead of the GPS two dimensions), accelerometer and altimeter data can also be used. Such vertical movement data can be measured during the same intervals as the GPS data mentioned above. Alternatively, the GPS sensor may be able to provide location data in three dimensions (e.g., latitude, longitude, and altitude) as well as a time measurement. The inclusion of the time measurement may be used, for example, to weight the location data 120 and 125 from the mobile devices 105 and 110. It is noted that GPS tracking data is well known in the art. Also, the use of accelerometers and altimeters is well known in the art.

In one example, the location data 120 about the movement of the mobile device 105 can be determined from GPS data generated by the mobile device 105. The mobile device 105 can use the GPS device of the mobile device 105, for example, to log the GPS data (e.g., longitude and latitude). As previously described, the GPS data can be logged at various intervals that can be defined, by way of example only, in terms of distance, time, device measurements, or the like or any combination Accelerometer data may also be logged with the longitude and latitude data. The particular context (e.g., riding, walking, driving) can be determined from accelerometer data and/or the GPS data as previously described. In another example, the particular context can be derived from the GPS device itself since GPS technology allows for the determination of speed (distance traveled divided by time).

The location data 120 and 125 can be sent over a network 115 (wired/wireless, WAN/LAN, etc., or any combination thereof) to the server 170 that receives or collects the location data 120 and 125. In other examples, the data 120 and 125 can be sent to the server 170 via a peer-to-peer network.

By way of example, in FIG. 1, the server 170 receives the location data 120 from the mobile device 105. This location data 120 describes the path 130 of the mobile device 105 as well as the path taken by an individual carrying the mobile device 105. Once the location data 120 is collected, the server 170 can determine a traversable path 131 from the location data 120. The traversable path 131 is based from the location data 120 (i.e. from the traversed path 130). The traversed path 130 by an individual in the past can lead to the traversable path 131 for use by other (or the same) individuals in the future.

In this example, the traversed path 130 is not necessarily identical to the traversable path 131. For example, the mobile device may follow a path that encounters significant elevation. The location data from other mobile devices indicate that the elevation is avoided. As a result, the traversable path 131 determined by the server 170 may differ from the traversed path 130 followed by the mobile device 105. Alternatively, the traversed path 130 may also correspond to the traversable path 131.

In one example, the traversable path 131 can be the exact same path as the traversed path 130. In another example, if a multitude of traversed paths 130 are available to the server 170, then an interpolation can be performed to obtain one (or more) traversable path(s) 131 using techniques such as those that are well known in the art. In one example, an interpolation component or module can perform the mathematical calculations to determine the traversable path 131 from the traversed path 130.

The server 170 can superimpose any non-predetermined traversable paths 131, 135 and 140 onto a map 160 already having predetermined paths 145 and 150 (e.g., roads). After superimposing the paths 131, 135 and 140 onto the map 160, the map 160 as a whole can be packaged for delivery or display, either to or on the original mobile device 105 and 110 that supplied the location data 120 and 125 or to or on any other computing device such as computing devices 180 and 185.

In one example, a multiple number of devices can provide location data that enables the server 170 to determine a traversable path in a given area. The location data from each device can be weighted according to various heuristics, although this is optional. For example, location data from trusted users can be given more weight than data from new or unverified users.

In one example, trusted mobile devices (and/or users thereof) can be determined based on the validity or quality of previous contributions of location data. Mobile devices that contribute location data that results in traversable paths are trusted or can become more trusted over time. For example, if the mobile device 110 consistently provides location data 125 to the server 170 that comports with location data given by other mobile devices, then the mobile device 110 can accumulate a reputation for being accurate and thus become trusted.

Weighting factors can be set according to the desired need. For example, the extent to which an area has been mapped can influence how the weighting factors are set. In an area that is poorly mapped, the location data from trusted devices may be given more weight when determining the traversable paths in the area compared to mobile devices that are not trusted or that are less trusted.

The weighting factors of the location data or of the mobile device may also be based on a speed associated with the mobile device. Mobile devices that travel closer to the average speed of other mobile devices in the same area may be more heavily weighted as a typical mobile device. Mobile devices that are moving faster (e.g., a mobile device carried by a skateboarder) or slower (e.g., a mobile device carried by a person moving furniture), however, might take an unusual path in the area and be weighted more lightly.

The weighting factors of the location data could also be based on accelerometer data or other sensor data. For example, the sensor data can be used to establish likelihood that the mobile device is carried by a user that is walking, running, or engaged in some other different form of travel. The form of travel that is determined from the sensor data (and/or the location data) may also factor into how the mobile device is weighted.

Orientation of the mobile device may also be used determine how the location data is weighted. For example, a change in an orientation of the mobile device or cessation in the movement of the mobile device may indicate someone sitting down briefly as opposed to a clear walking path. The corresponding location data can be weighted accordingly. For instance, location data associated with veering off of a path to sit down may not be incorporated into the traversable path. At the same time, however, this information may be used to identify a resting spot in the area. The location data may also be weighted by determining how much time has elapsed time since the location data was collected.

In other examples, users can provide personal information, home address, phone number, etc., to become trusted or to make their corresponding devices trusted devices. As these users provide more of this type of personal information, the location data provided by their respective mobile devices becomes more trusted. At the same time, when the mobile devices of users that provide personal information are consistently wrong about what is a traversable path (based on their own traversed path, for example), then the trust status of the users and/or their mobile devices can be diminished or negated.

For example, the mobile devices of users that consistently trespass or jump fences may receive or be assigned a decreased or annulled trusted status. Alternatively, the location data from the mobile devices of these users may suggest that they are traversing paths that other users avoid or do not take for various reasons (e.g., trespassing, construction, etc.). One way to determine this would be to cross-reference such users' traversed path against known barriers (e.g., pictures provided by other users) in a map database. Even though these users may traverse paths that others do not follow, there may be reasons for including such paths or for selectively displaying these paths on a map.

As mentioned previously, as users traverse paths, they can take pictures and/or videos with their mobile devices. For instance, a user may take a picture of a fence and still jump the fence to inform the server 170 that the path being traversed has a barrier. The picture, in combination with the location data from the user's mobile device, results in the server 170 gaining a better understanding of how physical barriers look and how the barrier relates to the path.

In some examples, human administrators having access to the server 170 can also rank traversable paths based on picture and/or video data taken by users with mobile devices. Alternatively, image recognition applications or other applications and modules may be employed to automatically review the picture and/or video data and rank the traversable paths without human input.

Thus, the location data 120 and 125 may also include video and/or picture data. The video and/or picture data can be associated with a specific location. For example, the server 170, when generating the map 160, can also embed the video and/or picture data associated with the path being followed in any map delivered to devices. The mobile devices 105 and 110, for example, may be alerted in advance with picture and/or video data that illustrates what users of the mobile devices 105 and 110 can expect to see or experience based on their current path.

In another example, any outlier data that is gathered from a multitude of location data can be discarded or relied upon, depending on a determination of whether the outlier data is reported to be useful. Such utility reporting can be received from the mobile devices 105 and 110 by the server 170. If a user texts or writes via a mobile application that the traversable path 131 is difficult or inaccurate, the server 170 can take this report and incorporate it for future use. The server 170 can also provide an alternative path at such a point. Additionally, the data may be discarded if enough mobile devices do not traverse along a path corresponding to the location data and the outlier data is inconsistent with the location data. On the other hand, the location data can be a basis for a new path if it proves to be useful. The measure of utility of path data can be set by an administrator according to a specified need/desire.

In one example, a traversed path that avoids physical obstacles can be the basis for a traversable path. Such obstacles can include man-made structures (walls, holes, etc.) or they may include flora (trees, rivers, etc.). In some examples, the location data 120 and 125 can be used to identify physical obstacles in the area. For example, the location data 120 and 125 may suggest that certain locations in an area are avoided by users of the mobile devices 105 and 110. This enables the server 170 to infer or to identify the avoided locations as physical obstacles, even when the server 170 may not know the specific nature of the physical obstacles. In some examples, picture and/or video data of the physical obstacles may be received by the mobile devices 105 and 110.

In another example, a less traversable path than the traversable path may be determined. The traversable path may be a shortcut of some sort, whereas the less traversable path may be a still better shortcut, albeit through a construction zone. If safety is one concern for the map users, the map users may choose the traversable path; if time is of the essence, the less traversable path can be followed.

In another example, the map may be a walking map, a traffic map, or just about any other kind of a map. The GPS, accelerometer, and other device data can not only provide relatively precise 3D movement, but can also indicate what type of vehicle (if any) the user of the mobile device is using. For instance, accelerometer data can indicate if a faster moving object, such as a car is making the traversed path (based on relatively large acceleration and deceleration data) or if a slower moving object, such as an individual merely walking is making the traversed path. The vertical movement of cars, for example, is often constrained in the vertical direction. As a result, the accelerometer data would tend to suggest two dimensional motion. The vertical movement of walking people, in contrast, is rhythmic with a sharp impulse at the bottom. Thus, the accelerometer data can be used to distinguish between what type of vehicle, if any, the user of the mobile device is using.

In another example, in order to address potential privacy and tracking concerns, the location data 120 and 125 can by anonymized. This allows the path 130 to be disassociated with the mobile device 105 and/or with the user of the device 105. One way to accomplish this is to assign an anonymously generated identification number (the anonymous number can also be random) to each mobile device and keep the mapping of the devices to anonymous numbers in a secure and separate server. In one example, this can be a third party secure server.

Regarding this last example, a mobile user, 'John', with phone number 555-1234, can be assigned an anonymous number 43A54CDE33X445E33, and the path followed by John will be tracked by the anonymous number and not his phone number or a mobile device identification number. In addition, the anonymous number can be reset to remove the ability to determine that John is associated with a given path. Once a path is determined, the associated identifier can be disassociated from the path. Further, the location data can be sent to multiple servers for random time-delay anonymization to reassure users that the location data cannot be pieced together to extract the anonymous numbers (or other identifiers) used or associated, for example, with the mobile device 105 or the user of the mobile device 105.

The location data 120 and 125 can be sent from the mobile devices 105 and 110 every set interval to the server 170, or it can be batched on the mobile devices 105 and 110 in order to, for example, preserve battery life. The communications between the server 170 and mobile devices 105 and 110 (or other devices/clients) can be dynamic to the extent that any maps using or incorporating the location data 120 and 125 stay current according to a standard set by those using or making such maps. Tradeoffs between battery life and up-to-date information can be considered.

Figure 2:
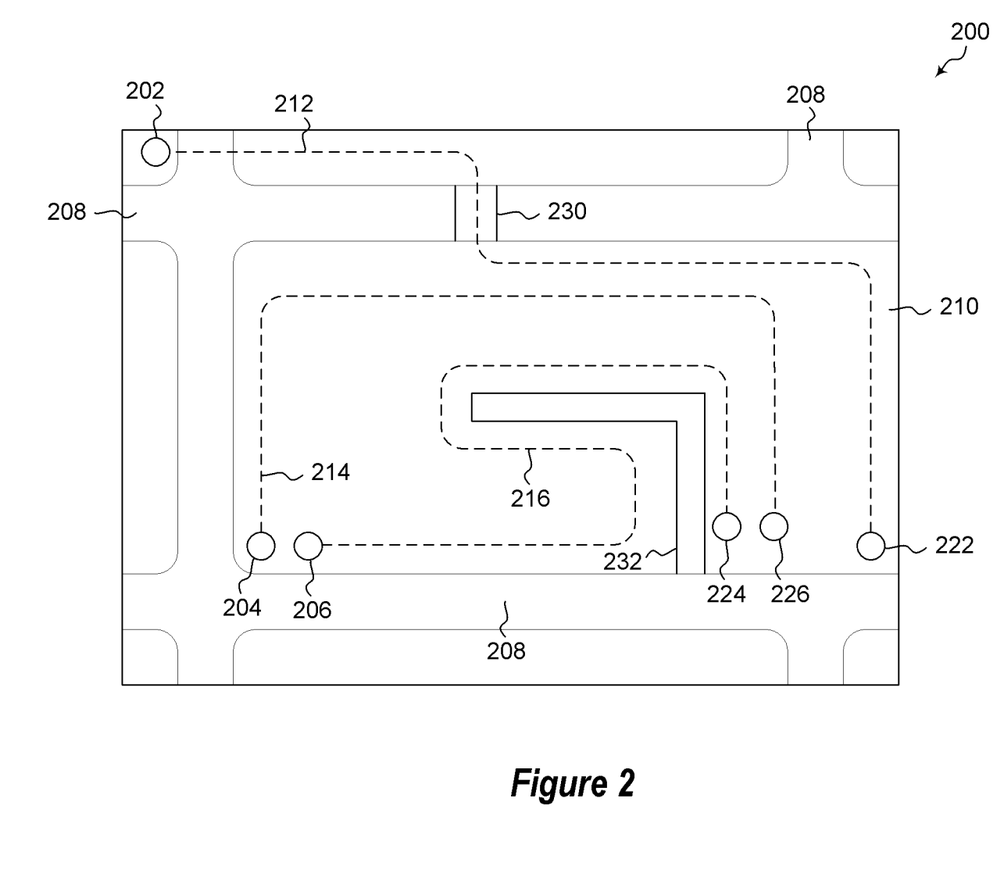
FIG. 2 shows an example of paths followed by users of mobile devices.

FIG. 2 shows an example of paths followed by users of mobile devices. A map 200 illustrated in FIG. 2 includes roads 208 (which may already be known and are predetermined) and an area 210 (e.g., a park or other area that may not have mapped traversable paths). FIG. 2 illustrates paths 212, 214, and 216 that are examples of paths followed by mobile devices. The path 212 begins at point 202 and ends and point 222. The path 214 begins at point 204 and ends at point 226. The path 216 begins at point 206 and ends at point 224. The paths 212, 214, and 216 are represented by dashed lines. In one example, location data or instances of location data (i.e., specific measurements of latitude and longitude) may be collected at each dash in the paths 21, 214, and 216 from each of the mobile devices. Thus, each dash represents an interval, for example, in terms of time and/or distance. Each of the paths 212, 214, and 216 can be generated by analyzing the location data collected from the respective mobile devices associated with the paths 212, 214, and 216.

In this example, the area 210 includes a barrier 232. The barrier 232 may be, by way of example only, a natural barrier (e.g., water, flora, elevation change) or a man-made barrier (e.g., construction, physical divider). The location data associated with the path 216 suggests that the user encountered the barrier 232 and went around the barrier 232 to arrive at the point 224.

In this example, the location data associated with the path 212 overlaps with location data that is already known. At an area 230, the location data of the path 212 may overlap with data about the road 208 that may already be pre-determined. The server 170 may be able to determine, particularly as more location data is received from the area 230, that the area 230 may correspond to a crosswalk. In one example, a user may take a photograph of the crosswalk and provide the photograph to the server 170. In this sense, the traversable paths that are generated may be used to identify features of traversable paths that are not generally known in advance. A user that desires to cross a busy road, for example, may be able to follow a traversable path to a crossroad that has been previously identified by the server 170.

Figure 3:
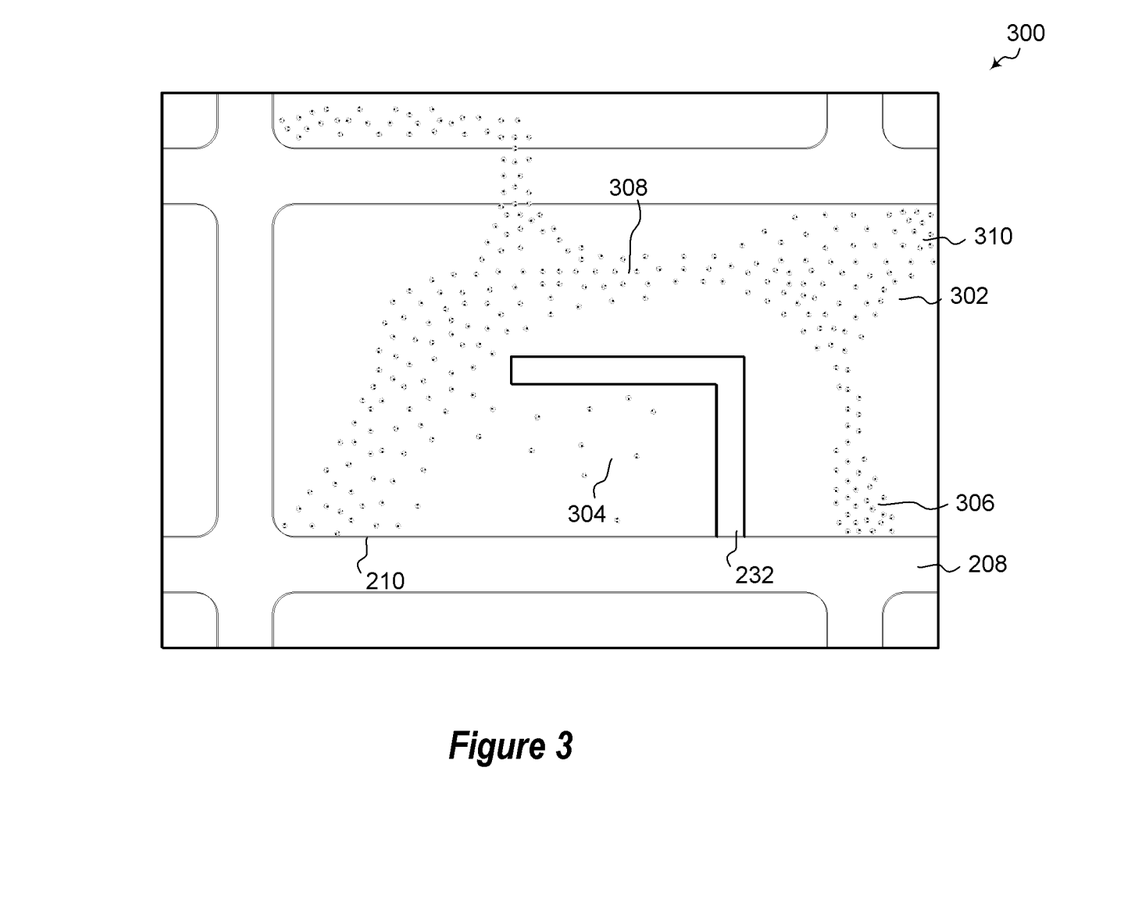
FIG. 3 shows an example of location data that is collected from mobile devices and used to determine traversable paths in an area of the map shown in FIG. 2.

FIG. 3 shows an example of location data that is collected from mobile devices and used to determine traversable paths. In this example, location data 308 (which may be an example of the location data 120 and/or 125) has been collected relative to the area 210 from multiple devices. The location data 308 as illustrated in FIG. 3 can be suggestive of a traversable path or of traversable paths in the area 210. The relatively less dense location data 304, combined with the location data 308, can indicate to the server 170 that the area 210 includes the barrier 232.

FIG. 3 further illustrates that the server 170 may be able to identify a fork 302 in the location data 308 and thus in the traversable path being determined. The location data 308, which includes location data 306 and 310, diverges at the fork 302. However, the location data 306 and 310 still have sufficient density to suggest a traversable path. The density of the location data 304, however, suggests that at least a portion of the path 216 (see FIG. 2) may not be included in a traversable path of the map 200 because of the barrier 232.

FIGS. 2 and 3 further illustrate that, when determining the traversable paths in the area 210, the location data from the mobile devices can be considered individually or collectively. FIG. 2 demonstrates that individual paths can be considered when generating the traversable path. FIG. 3 demonstrates that the density of location data 308 from multiple mobile devices in the area 210 can be used to identify the traversable paths in the area 210.

Figure 4:
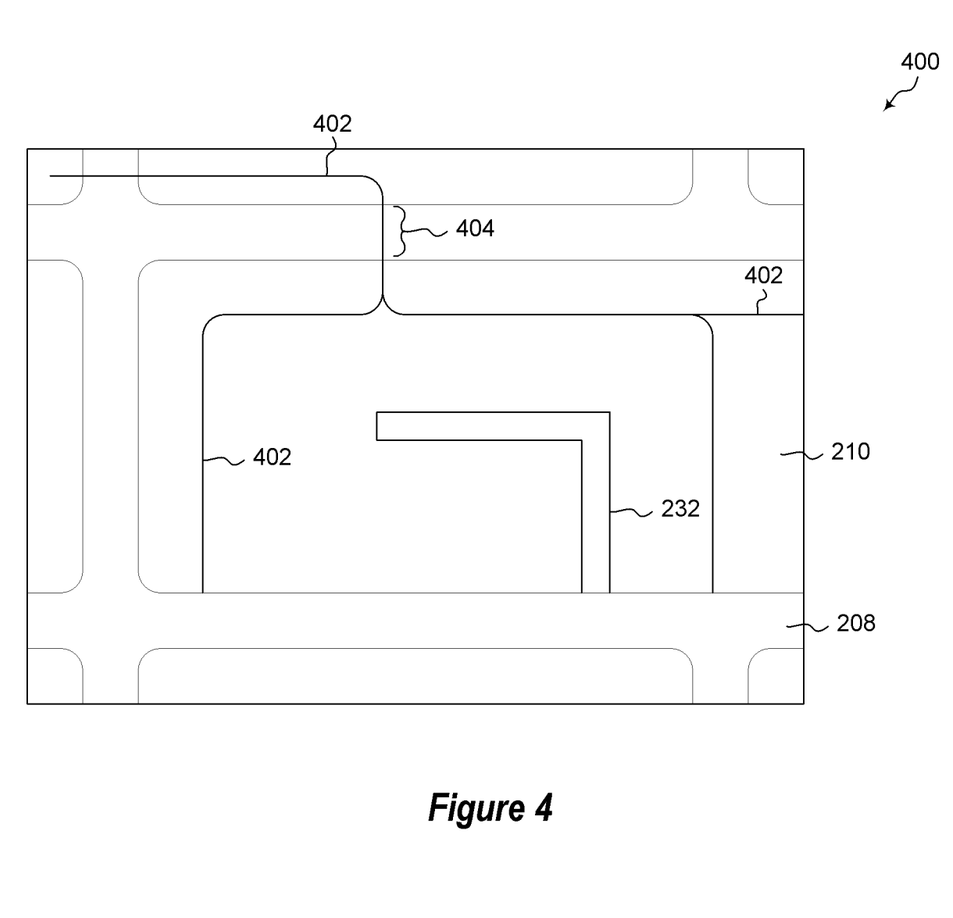
FIG. 4 shows an example of a traversable path that has been superimposed on the map shown in FIGS. 2 and 3.

FIG. 4 shows an example of a traversable path that has been superimposed on the map illustrated in FIGS. 2 and 3. In this case, a traversable path 402 has been identified in the map 200 after the server 170 has determined at least one traversable path for the area 210. The traversable path 402 may be overlaid or superimposed on the map 200 to illustrate the traversable path 402 to devices that request the map 200.

In some embodiments, the map 200 may also be provided with a visual indication of the barrier 232 (e.g., with picture and/or video data from one of the mobile devices that encountered the barrier). In this example, the area 210 can be immediately traversed by following the path 402, thus avoiding the barrier 232. Further, the map 200 may also identify a crosswalk 404 in the road 208 as part of the traversable path 402.

In one example, the map 200 may be informed by the traversable path 402 or by other traversable paths determined by the server 170 of amenities in the area 210. Amenities such as, by way of example only, the locations of restrooms, benches, scenery, or the like may be determined from the location data collected by the server 170.

The amenities can be determined from the picture and/or video data that may be included in the location data. In addition, the sensor data that may be included in the location data can be used to determine the locations of benches, restrooms, or the like. For example, the cessation of movement and change in elevation (e.g., such as when a person sits down) when the mobile device 105 is in the area 210 may indicate a bench or other rest area along a traversable path. As additional location data from other mobile devices provides corroboration, the traversable paths can inform the map 200 of other secondary data.

The secondary data derived from the location data can also be used to identify which traversable paths (or other paths including known roadways) are traversed more frequently. This can be used to identify traversable paths that are popular or frequently traveled. The secondary data can also be used to identify when and/or how the traversable paths are used. For instance, the secondary data may indicate when and where a crowd is anticipated to be present or when and where a particular area is likely to be crowded. In an embodiment, the secondary data can be displayed on the map 200 independently of the traversable paths.

Figure 5:
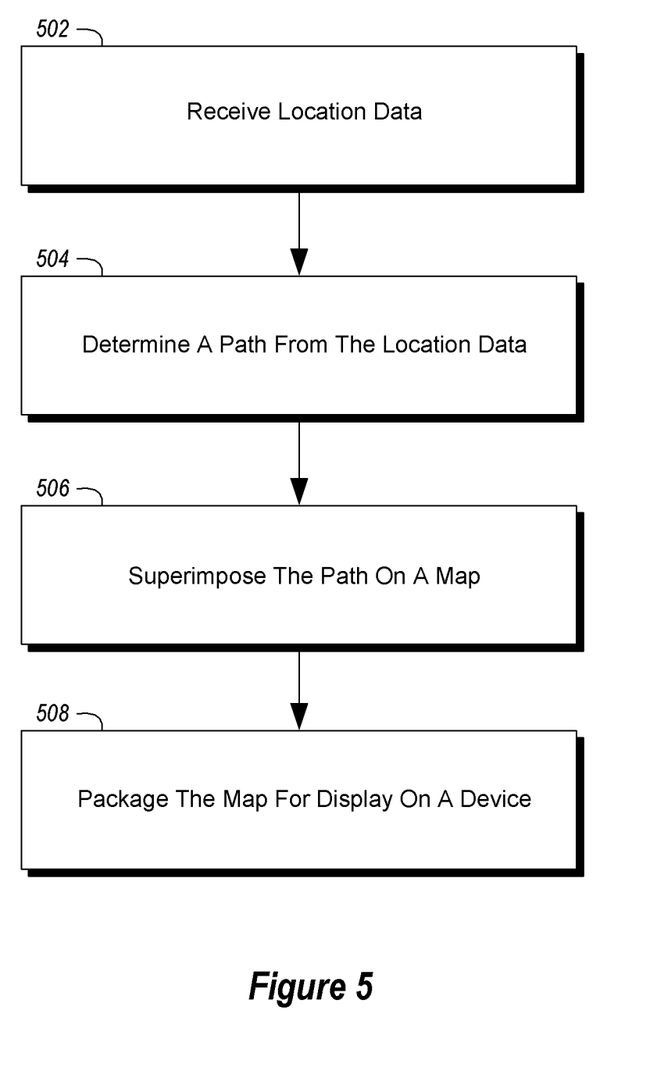
FIG. 5 is a flow diagram of an illustrative embodiment of a method for determining traversable paths in an environment.

FIG. 5 is a flow diagram of an illustrative embodiment of a method for determining a traversable path. In block 502, a server receives location data from at least one device operating in an area. More generally, the server receives location data from multiple devices operating in the area. The location data, as previously stated, may include one or more of GPS data, identification data, video data, picture or image data, personal information, or the like or any combination thereof.

In block 504, the server analyzes the location data and determines a traversable path from the location data received from the mobile devices. Determining a traversable path can include performing interpolation on the location data to connect instances of location data, identifying trends (e.g., densities) in the location data of multiple mobile devices, considering the trusted status of the mobile devices, or the like or any combination thereof.

In block 506, the server superimposes the traversable path determined in the block 504 on a map. The server may also provide the traversable path in another manner. The traversable path can be integrated with the map, delivered as a separate layer, or the like. For example, an existing road map may include parks or other areas. The path(s) determined in the block 504 may be the traversable paths in the parks. As a result, the traversable paths can be superimposed on the parks of the map of the area that is displayed on devices.

In block 508, the map, including the traversable paths, are packaged for display on device. The resulting map can be displayed on any device, including mobile devices and other non-mobile devices.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those generally found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Figure 6:
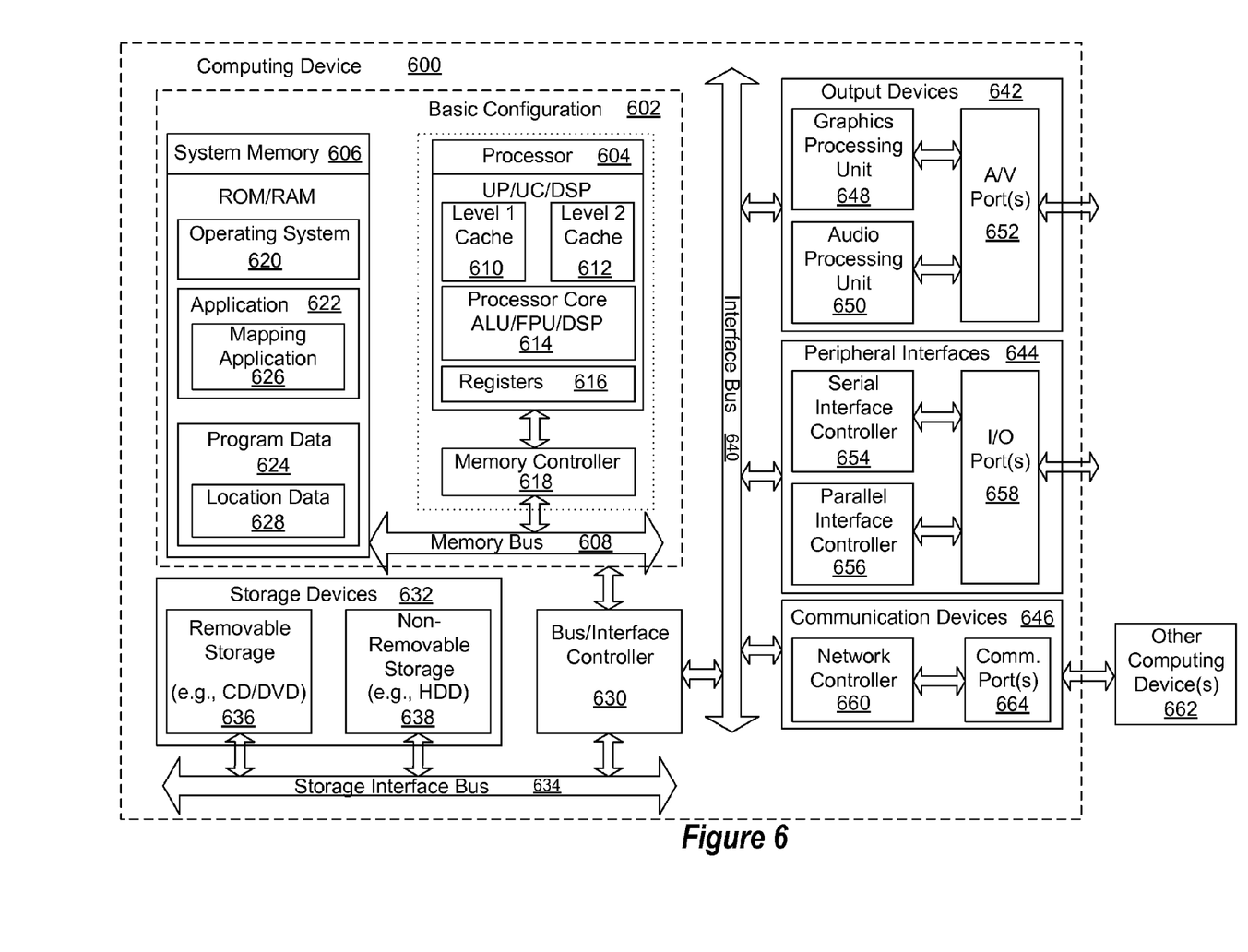
FIG. 6 shows an example computing device for a map modeling system.

FIG. 6 shows an example computing device 600 that is arranged for modeling an environment, including generating traversable paths in an area, in accordance with the present disclosure. In a very basic configuration 602, computing device 600 generally includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include a mapping application 626 that is arranged to generate traversable paths from location data collected from devices including mobile devices. Program Data 624 may include stored location data 628 that may be useful for generating the traversable paths in an area. In some embodiments, application 622 may be arranged to operate with program data 624 on operating system 620 such that traversable paths are generated and packaged with existing maps such that the maps identify traversable paths in the areas of the map. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more NV ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

Figure 7:
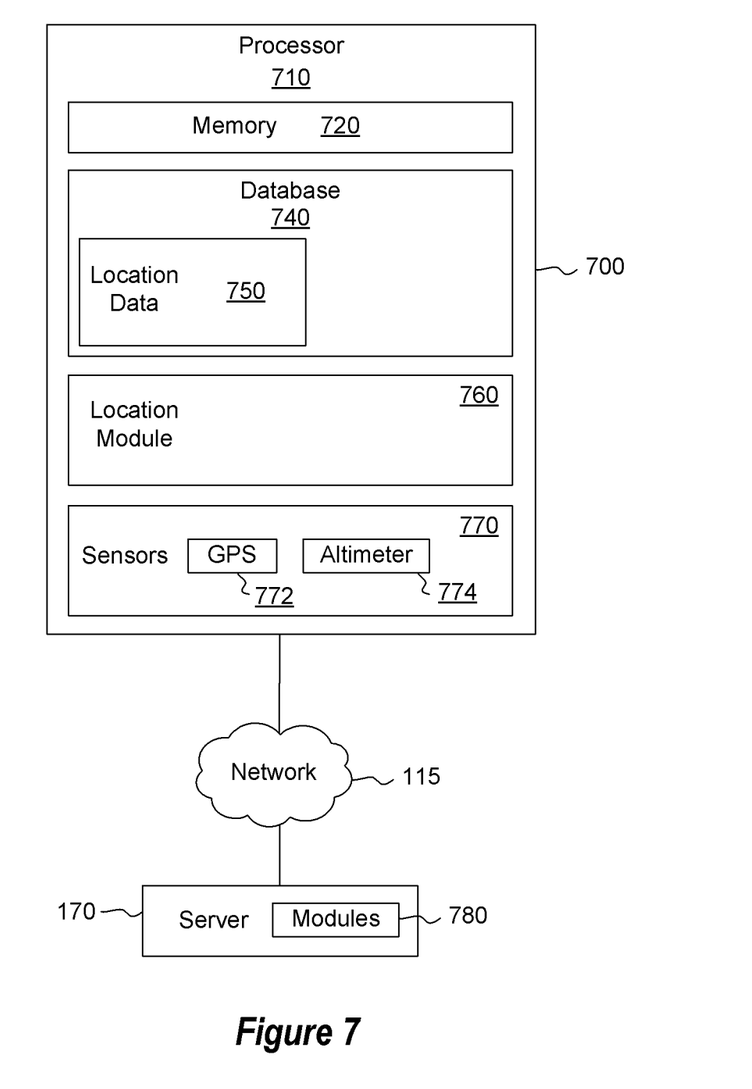
FIG. 7 shows an illustrative embodiment of a special purpose computing device.

FIG. 7 shows an illustrative embodiment of a special purpose computing device 700, such as a mobile device. The device 700 includes a processor 710, which may be similar to the processor 604. The device includes memory 720, which may be used to store a database 740 and a location module 760. The device 700 is a location-enabled device and the location module 760 is used to identify a location of the device 700 and then log or store the location data in the database 740 as location data 750, which is an example of the location data 120. The location data 750 may include data from any of sensor 770, such as a GPS 772 and an altimeter 774. The location module 740 may then transmit the location data 750 to the server 170 over the network 115. As described herein the location data 750 can be used to determine traversable paths in an area.

The server 170 may also have modules 780 for determining traversable paths in an area. The modules 780 (e.g., a location module, a map module), for example, may receive location data from multiple mobile devices operating in an area, determine traversable paths from the location data, superimpose the traversable paths on a map of the area, or the like or any combination thereof. The server 170 may also deliver the map, including the traversable paths, to devices that request the map including the traversable paths. The server 170 may also cooperate with other mapping services to deliver the traversable paths in a manner that permits the traversable paths to be displayed on mobile devices.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method to construct a path analysis in an area, the method comprising:
    receiving a first set of location data from a first mobile device, the first set of location data comprising multiple data points of physical locations traversed by the first mobile device that represent a first path in an area traversed by the first mobile device;
    generating, using a processor, a traversable path based on the first set of location data without using traditional maps, the traversable path following a non-predetermined path that at least partially does not adhere to predetermined paths identified in the traditional maps and including a portion that deviates from the first path traversed by the first mobile device, the portion of the traversable path that deviates from the first path traversed by the first mobile device determined based on differences between the first set of location data and one or more second sets of location data from one or more second mobile devices, the one or more second sets of location data comprising multiple data points of physical locations traversed by the one or more second mobile devices in the area traversed by the first mobile device;
    superimposing the traversable path onto a map; and
    packaging the map for delivery or display of the map at a device.

2. The method of claim 1, further comprising polling the one or more second mobile devices for the one or more second sets of location data.

3. The method of claim 1, wherein the map is a three-dimensional map.

4. The method of claim 3, wherein the map is a traffic map or a walking map.

5. The method of claim 1, wherein receiving a first set of location data comprises:
    assigning an anonymous identification number to the first mobile device; and
    tracking the first path of the first mobile device using the anonymous identification number.

6. The method of claim 1, wherein the first set of location data is batched by the first mobile device.

7. The method of claim 1, wherein the first set of location data includes GPS data indicative that the first mobile device is used in a vehicle or the first mobile device is used on a person.

8. The method of claim 1, wherein generating the traversable path includes rejecting outlier location data, wherein the outlier location data is inconsistent with the first set of location data.

9. The method of claim 1, further comprising at least one of:
    rating the traversable path for an intended purpose; and
    receiving at least one of picture data or video data from the first mobile device, wherein the map superimposed with the traversable path includes at least one of the picture data or the video data.

10. A method to determine traversable paths in an area, the method comprising:
    receiving location data from each of a plurality of mobile devices, the location data comprising multiple data points of physical locations traversed by the plurality of mobile devices that represent paths in an area traversed by the plurality of mobile devices;
    generating, using a processor, a traversable path from the location data without using traditional maps, the traversable path following a non-predetermined path that at least partially does not adhere to conventional paths shown in the traditional maps, wherein generating the traversable path includes:
        weighting the location data from the plurality of mobile devices; and interpolating the weighted location data to generate the traversable path such that the traversable path includes portions of more than one of the paths traversed by the plurality of mobile devices; and delivering a map of the area that includes the traversable path in the area to a requesting device.

11. The method of claim 10, wherein the traversable path is generated according to a density distribution of the location data received from each of the plurality of mobile devices.

12. The method of claim 10, further comprising superimposing the traversable path onto the map of the area.

13. The method of claim 10, further comprising:
receiving at least one of picture data or video data from at least one of the plurality of mobile devices, wherein the at least one of picture data or video data is incorporated into the map.

14. The method of claim 10, wherein receiving location data comprises collecting the location data from the plurality of mobile devices, wherein each of the plurality of the mobile devices logs its location data at intervals.

15. The method of claim 10, wherein the map is informed by the traversable path.

16. A system to model traversable paths in an area, the system comprising:
a location module configured to collect location data from mobile devices in an area, wherein the mobile devices that provide location data are location-enabled to provide the location data and the location data includes multiple data points of physical locations traversed by the mobile devices;
a database configured to store the location data collected from the mobile devices, wherein the location data identifies paths traversed by the mobile devices in the area;
a processor configured
to generate traversable paths in the area based on the paths traversed by the mobile devices without using traditional maps, the traversable paths following a non-predetermined path that at least partially does not adhere to conventional paths shown in the traditional maps and including a portion that deviates from at least one of the paths traversed by the mobile devices, the portion of the traversable paths that deviates from at least one of the paths traversed by the mobile devices determined based on differences between the at least one of the paths traversed by the mobile devices and one or more other paths traversed by others of the mobile devices; and
a map module configured to package a map for display on a device, the map including the area and the generated traversable paths.

17. The system of claim 16, wherein the processor is further configured to adapt the traversable paths over time to changes that occur in the area.

18. The system of claim 16, wherein the processor is further configured to anonymize the location data.

19. The system of claim 16, wherein the processor is further configured to determine secondary data from the location data and wherein the map module is further configured to package the secondary data for display on the device.

20. The system of claim 19, wherein the secondary data determines at least one of a popularity of the traversable paths, a density of people anticipated on the traversable paths, or amenities on the traversable paths.

21. The method of claim 10, wherein weighting the location data from the plurality of mobile devices includes:
determining whether the plurality of mobile devices are traversing their paths in motorized vehicles based on data collected from the plurality of mobile devices; and
weighting location data from the plurality of mobile devices not traversing their paths in motorized vehicles more than location data from the plurality of mobile devices traversing their paths in motorized vehicles.

22. The method of claim 21, wherein the location data from the plurality of mobile devices is further weighted based on an extent to which the area has been mapped and the plurality of mobile devices being trusted mobile devices.

23. The method of claim 21, wherein the location data from the plurality of mobile devices traversing their paths in motorized vehicles are given a weight of zero.

24. The method of claim 21, wherein data collected from the plurality of mobile devices used to determine whether the plurality of mobile devices are traversing their paths in motorized vehicles includes one or more of: accelerometer data from the plurality of mobile devices, orientation data from the plurality of mobile devices, and the location data from the plurality of mobile devices.

25. The method of claim 10, wherein weighting the location data from the plurality of mobile devices includes:
determining a speed at which the plurality of mobile devices are traversing their paths based on data collected from the plurality of mobile devices;
determining a medium, mean, average, or weighted average of the speeds of the plurality of mobile devices; and
weighting location data from the plurality of mobile devices traveling at speeds that approximately equal the medium, mean, average, or weighted average of the speeds of the plurality of mobile devices more than location data from the plurality of mobile devices traveling at speeds that do not approximately equal the medium, mean, average, or weighted average of the speeds of the plurality of mobile devices.

* * * * *

UNITED STATES PATENT AND TRADEMARK OFFICE
CERTIFICATE OF CORRECTION

PATENT NO. : 8,818,711 B2
APPLICATION NO. : 12/642355
DATED : August 26, 2014
INVENTOR(S) : Kruglick Page 1 of 1

It is certified that error appears in the above-identified patent and that said Letters Patent is hereby corrected as shown below:

IN THE DRAWINGS:

In Fig. 6, Sheet 6 of 7, delete "UP/UC/DSP" and insert -- µP/µC/DSP --, therefor.

IN THE SPECIFICATION:

In Column 11, Line 44, delete "and or" and insert -- and/or --, therefor.

In Column 13, Line 47, delete "NV ports" and insert -- A/V ports --, therefor.

In Column 14, Line 26, delete "location module 740" and insert -- location module 760 --, therefor.

IN THE CLAIMS:

In Column 17, Lines 36-48, in Claim 16, delete "to generate................devices; and" and insert the same at Line 35, after "configured", as a continuation sub-point.

Signed and Sealed this
Third Day of February, 2015

Michelle K. Lee
*Deputy Director of the United States Patent and Trademark Office*